US010696145B2

United States Patent
Hunter et al.

(10) Patent No.: US 10,696,145 B2
(45) Date of Patent: Jun. 30, 2020

(54) SIDE TO SIDE ROLLER TARP SYSTEM

(71) Applicant: Roll-Rite LLC, Gladwin, MI (US)

(72) Inventors: Stephen Hunter, Midland, MI (US); Douglas Piccard, Ypsilanti, MI (US); Robert Malcolm, Waterford, MI (US); James Pinon, Troy, MI (US)

(73) Assignee: Roll Rite LLC, Gladwin, MI (US)

( * ) Notice: Subject to any disclaimer, the term of this patent is extended or adjusted under 35 U.S.C. 154(b) by 0 days.

(21) Appl. No.: 16/089,451

(22) PCT Filed: Mar. 30, 2017

(86) PCT No.: PCT/US2017/025215
§ 371 (c)(1),
(2) Date: Sep. 28, 2018

(87) PCT Pub. No.: WO2017/173189
PCT Pub. Date: Oct. 5, 2017

(65) Prior Publication Data
US 2019/0111770 A1    Apr. 18, 2019

Related U.S. Application Data

(60) Provisional application No. 62/315,053, filed on Mar. 30, 2016.

(51) Int. Cl.
*B60J 7/08* (2006.01)
*B60P 7/04* (2006.01)
(Continued)

(52) U.S. Cl.
CPC ............. *B60J 7/085* (2013.01); *B60J 7/065* (2013.01); *B60P 7/04* (2013.01); *B60P 7/0807* (2013.01);
(Continued)

(58) Field of Classification Search
CPC ... B60J 7/085; B60J 7/065; B60P 7/04; B60P 7/0807; F16H 48/11
(Continued)

(56) References Cited

U.S. PATENT DOCUMENTS 5,887,937 A * 3/1999 Searfoss ................. B60J 7/085
296/122
5,944,374 A * 8/1999 Searfoss ................. B60J 7/085
296/100.14
(Continued)

Primary Examiner — Joseph D. Pape
(74) Attorney, Agent, or Firm — Miller Canfield

(57) ABSTRACT

A roller tarp system for covering a truck bed includes a first pivot arm assembly pivotally coupled to one side of the truck bed and a second pivot arm assembly pivotally coupled to an opposite side of the truck bed. A generally hollow and cylindrical tarp spool extends along a longitudinal axis between opposite first and second ends. The tarp spool is rotatably coupled between the first and second pivot arm assemblies for rotatably supporting a flexible tarp cover. A drive assembly is housed within the tarp spool adjacent one of the first and second ends. The drive assembly is operatively coupled between one of the first and second pivot arm assemblies and the tarp spool for selectively rotating the tarp spool and actuating the tarp system between an open position uncovering the truck bed and a closed position covering the truck bed.

12 Claims, 10 Drawing Sheets

(51) Int. Cl.
- *B61D 39/00* (2006.01)
- *F16H 1/46* (2006.01)
- *F16H 48/11* (2012.01)
- *B60J 7/06* (2006.01)
- *B60P 7/08* (2006.01)

(52) U.S. Cl.
CPC .............. *B61D 39/00* (2013.01); *F16H 1/46* (2013.01); *F16H 48/11* (2013.01)

(58) Field of Classification Search
USPC .......................................................... 296/98
See application file for complete search history.

(56) References Cited

U.S. PATENT DOCUMENTS

| | | | |
|---|---|---|---|
| 2002/0084672 A1* | 7/2002 | Searfoss | B60J 7/085 296/100.18 |
| 2008/0042466 A1* | 2/2008 | Searfoss | B60J 7/085 296/100.01 |
| 2012/0279331 A1 | 8/2012 | Liu | |
| 2012/0261939 A1 | 10/2012 | Schmeichel et al. | |
| 2013/0241230 A1 | 9/2013 | Knight et al. | |
| 2014/0265424 A1 | 9/2014 | Bremer et al. | |

* cited by examiner

SIDE TO SIDE ROLLER TARP SYSTEM

CROSS-REFERENCE TO RELATED APPLICATIONS

This application claims priority to and all the benefits of U.S. Provisional Application No. 62/315,053, filed on Mar. 30, 2016.

BACKGROUND OF THE INVENTION

1. Field of the Invention

The present invention relates to a roller tarp system for truck beds, and more particularly, to a roller tarp system having an internal drive assembly for selectively covering and uncovering the truck bed of a truck.

2. Description of Related Art

Many trucks, particularly those for hauling loose loads such as sand and gravel, need a truck cover or tarp system to prevent the wind from blowing load particles off the truck bed. Various apparatus have been devised for covering a truck bed and load. Some such apparatus include an external motor assembly for selectively winding a roller and tarp for covering the truck bed. An effective cover should be one which is easily operated by the truck driver so as to selectively cover and uncover the load in the truck bed from the convenient location of the truck cab.

Current tarp systems commonly include a pair of arms pivotally mounted along opposing sides of the truck bed and each of which includes a base and an extension. A tarp roller is rotatably mounted between the extensions of the arms for supporting a tarp. An external motor assembly is typically mounted to one of the extensions and coupled to the tarp roller for selectively winding the roller and tarp and automatically covering and uncovering the truck bed. However, the external motor increases the overall width of the truck bed and complexity of the tarp system while also remaining exposed to the elements and damage by debris loaded into the truck bed.

Therefore, it remains desirable to provide a tarp system having an internal drive assembly for selectively covering and uncovering the truck bed of the truck.

SUMMARY OF THE INVENTION

A tarp system is provided for covering a truck bed. The tarp system comprises a first pivot arm assembly adapted to be pivotally coupled to the truck bed and a second pivot arm assembly adapted to be pivotally coupled to the truck bed and spaced from the first pivot arm assembly. A generally hollow tarp spool extends along a longitudinal axis between opposite first and second ends. The tarp spool is rotatably coupled between the first and second pivot arm assemblies for rotatably supporting a tarp cover. A drive assembly is housed within the tarp spool adjacent one of the first and second ends. The drive assembly is operatively coupled between one of the first and second pivot arm assemblies and the tarp spool for selectively rotating the tarp spool and actuating the tarp system between an open position uncovering the truck bed and a closed position covering the truck bed.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
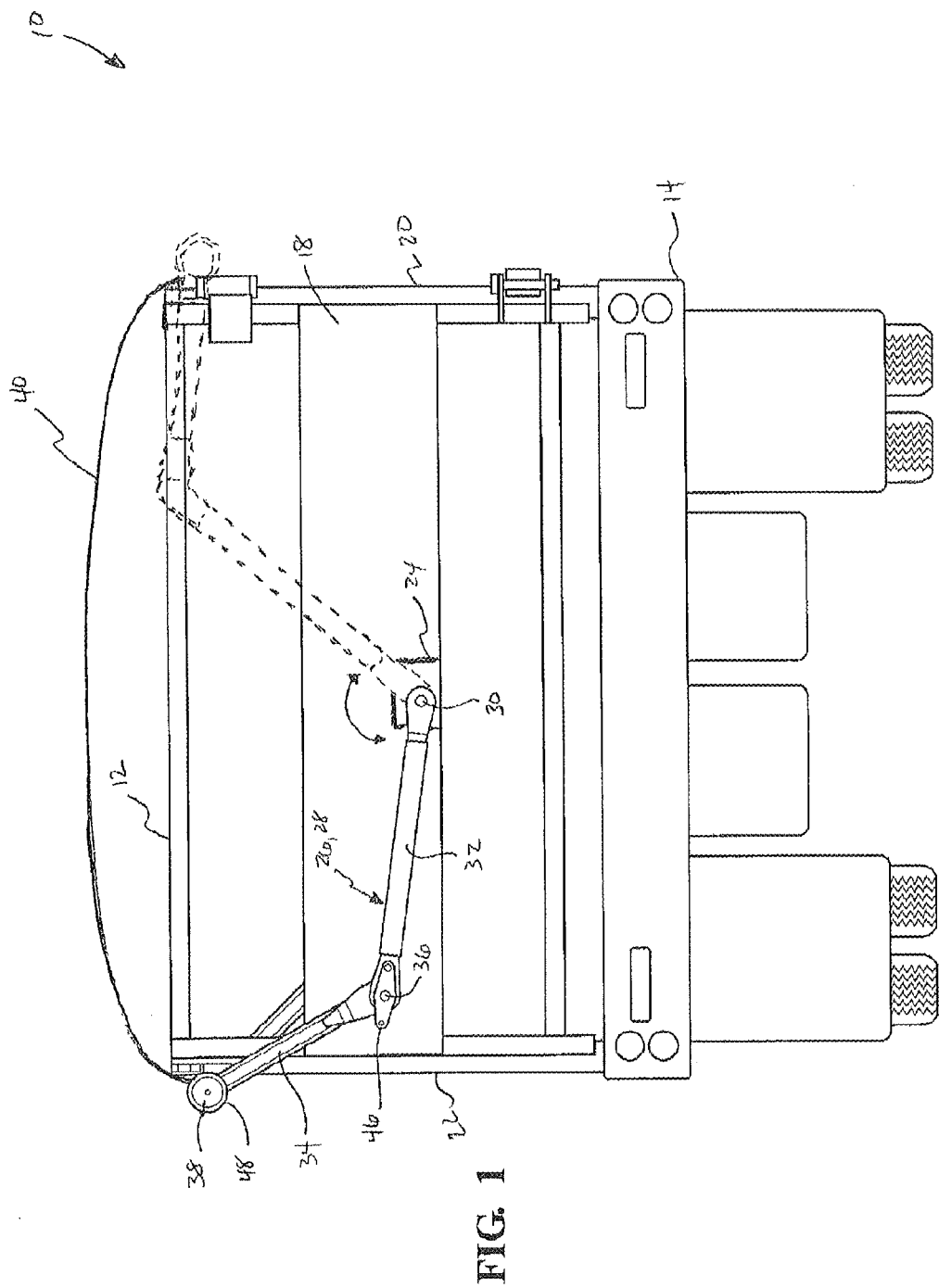
FIG. 1 is a rear view of a truck bed of a truck with a roller tarp system according to one preferred embodiment of the invention.
Figure 2:
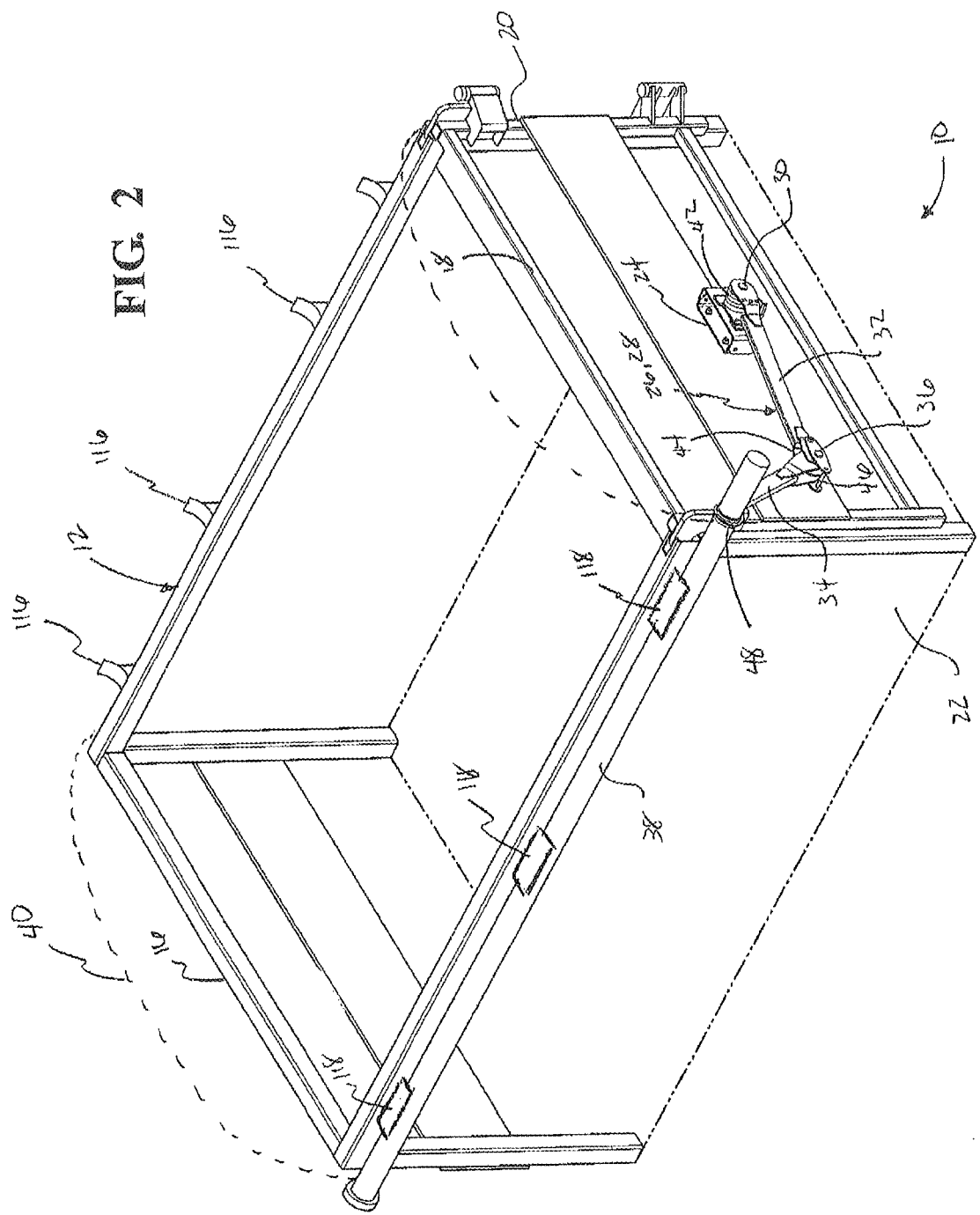
FIG. 2 is a perspective view of the truck bed with the roller tarp system in the closed position.

Referring to the Figures, wherein like numerals indicate like or corresponding parts throughout the several views, FIGS. 1 and 2 show a roller tarp system 10 according to the present invention for covering and uncovering the bed or trailer 12 of a truck 14. The truck 14 includes the truck bed 12 having front and rear ends 16, 18 extending laterally between opposite first and second sidewalls 20, 22. It should be appreciated that the truck 14 and truck bed 12 may be a single axle, tandem axle, single or double trailer bed, open trailer bed or the like which have a bed with an open top which needs to be covered by a tarp system. In FIG. 1, the roller tarp system 10 is shown operatively coupled to the front and rear ends 16, 18 of the truck bed 12, commonly referred to as a side to side tarp system, for selective operation between an open position (shown in phantom) uncovering the truck bed 12 and a closed position (shown in solid) covering the truck bed 12. However, it should be appreciated that the roller tarp system 10 may be operatively coupled to the first and second sidewalls 20, 22, front to back tarp system, without varying from the scope of the invention.

Referring to FIG. 1-4, the roller tarp system 10 includes a base plate 24 fixedly secured to each of the front end 16 and rear end 18 generally midway between the sidewalls 20, 22 for pivotally supporting the roller tarp system 10 between the open and closed positions. A pivot arm assembly 26, 28 is pivotally coupled to the base plate 24 by a fixed pivot post 30. Each pivot arm assembly 26, 28 includes an elongated lower pivot arm 32 extending between a first end pivotally coupled to the base plate 24 by pivot post 30 and an opposite second end and an elongated upper pivot arm 34 extending between a first end pivotally coupled to the second send of the lower pivot arm 32 by a fixed knuckle pivot 36 and an opposite second end. The roller tarp system 10 further includes a hollow, cylindrical tarp spool 38 extending longitudinally between and rotatably coupled to the second ends of each of the upper pivot arms 34 for rotatably spooling and supporting a tarp cover 40. The tarp cover 40 is generally made of flexible fabric, however, other like materials may be utilized without varying the scope of the invention.

Figure 3:
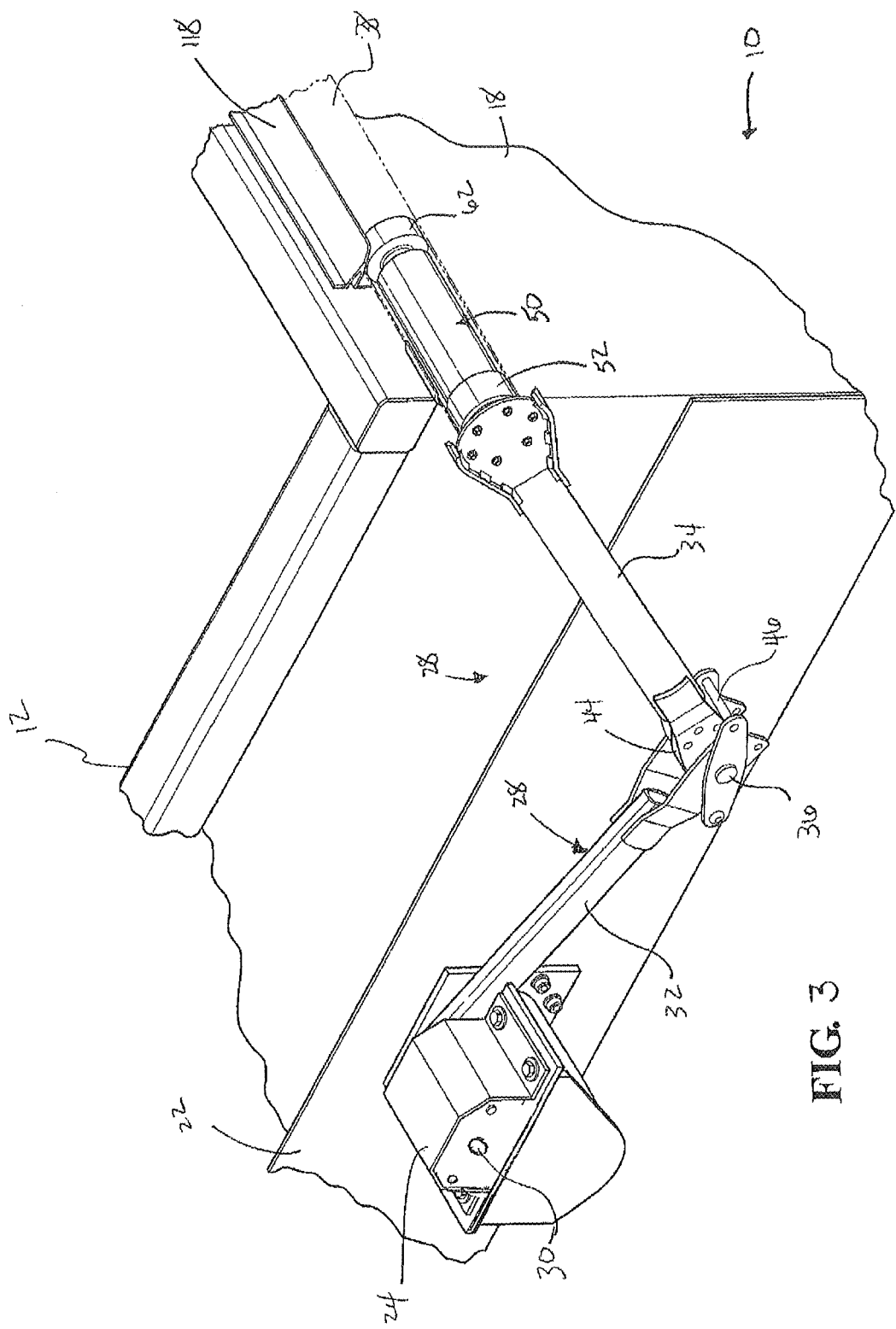
FIG. 3 is a fragmentary perspective view of the roller tarp system and motor assembly enclosed within the roller of the roller tarp system.
Figure 4:
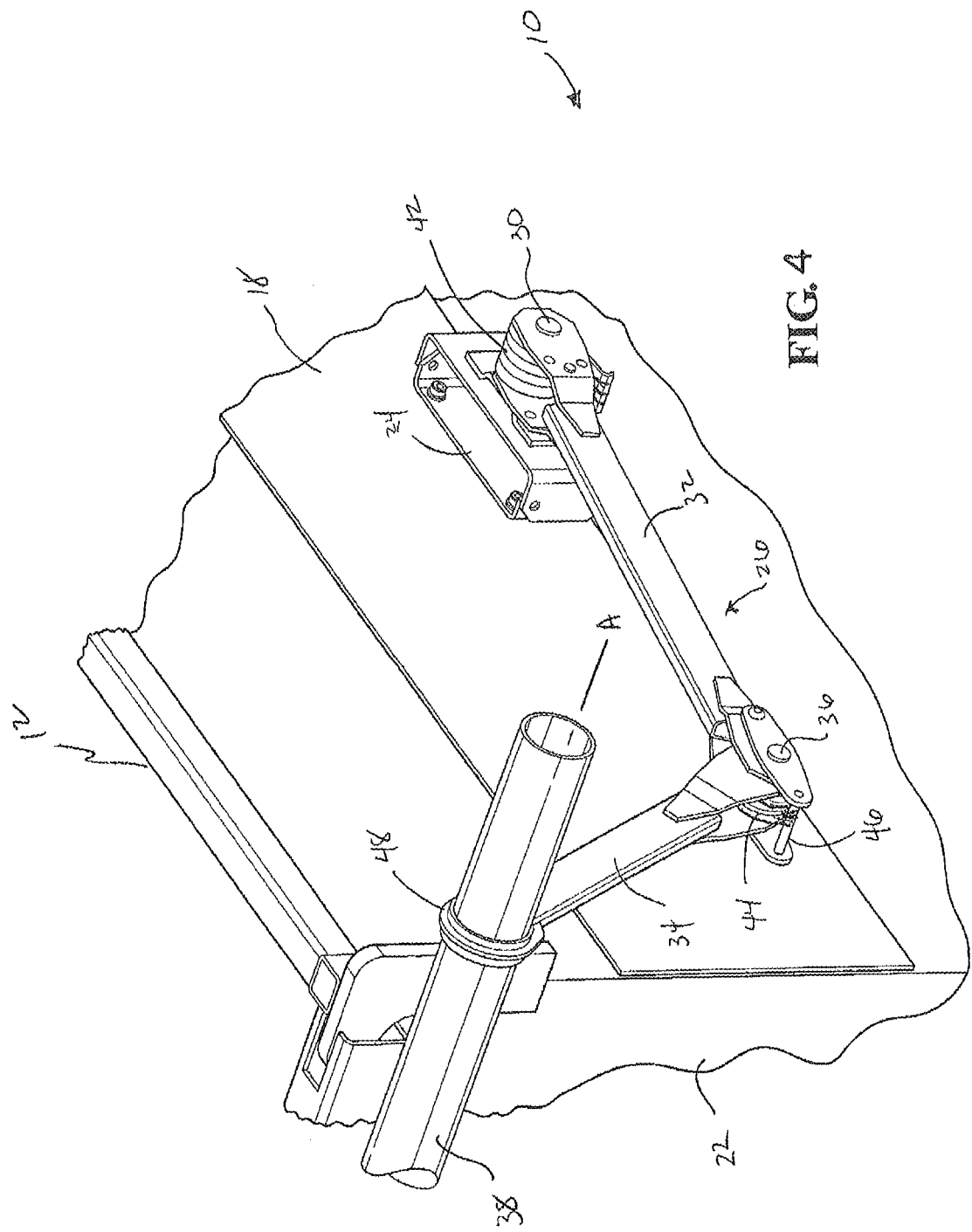
FIG. 4 is another fragmentary perspective view of the roller tarp system.

Referring specifically to FIG. 4, the base plate 24 includes at least one, but preferably a plurality of, first spiral torsion springs 42 for biasing the lower pivot arm 32 in the counterclockwise direction. Preferably, one end of each spring 42 engages a groove or notch formed in the fixed pivot post 30 and an opposite end engages a locator pin on the lower pivot arm 32. Further details of the first spiral torsion spring arrangement are taught in Applicant's U.S. Pat. No. 5,887,937, which is hereby incorporated by reference in its entirety. Similarly, at least one, but preferably a plurality of, second spiral torsion springs 44 are coupled between the lower pivot arm 32 and upper pivot arm 34 for biasing the upper pivot arm 34 in the counterclockwise direction. Preferably, one end of each spring 44 engages a groove or notch formed in the knuckle pivot 36 and an opposite end engages a locator pin on the upper pivot arm 34. Further details of the second spiral torsion spring arrangement are taught in Applicant's U.S. Pat. No. 5,944,374, which is also hereby incorporated by reference in its entirety. Additionally, rotation of the upper pivot arm 34 relative to the lower pivot arm 32 is limited by the upper pivot arm 34 engaging a blocking pin 46 projecting from the distal end of the lower pivot arm 32 spaced from the knuckle pivot 36 as shown in FIGS. 2-4.

Figure 5:
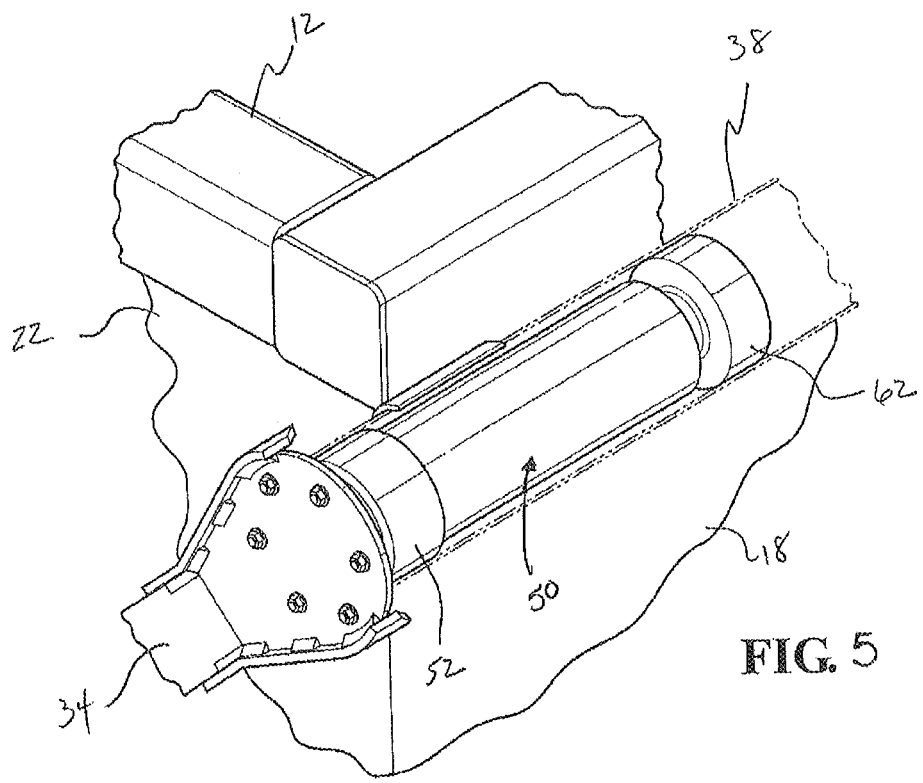
FIG. 5 is a fragmentary perspective view of the motor assembly enclosed within the roller of the roller tarp system.
Figure 6:
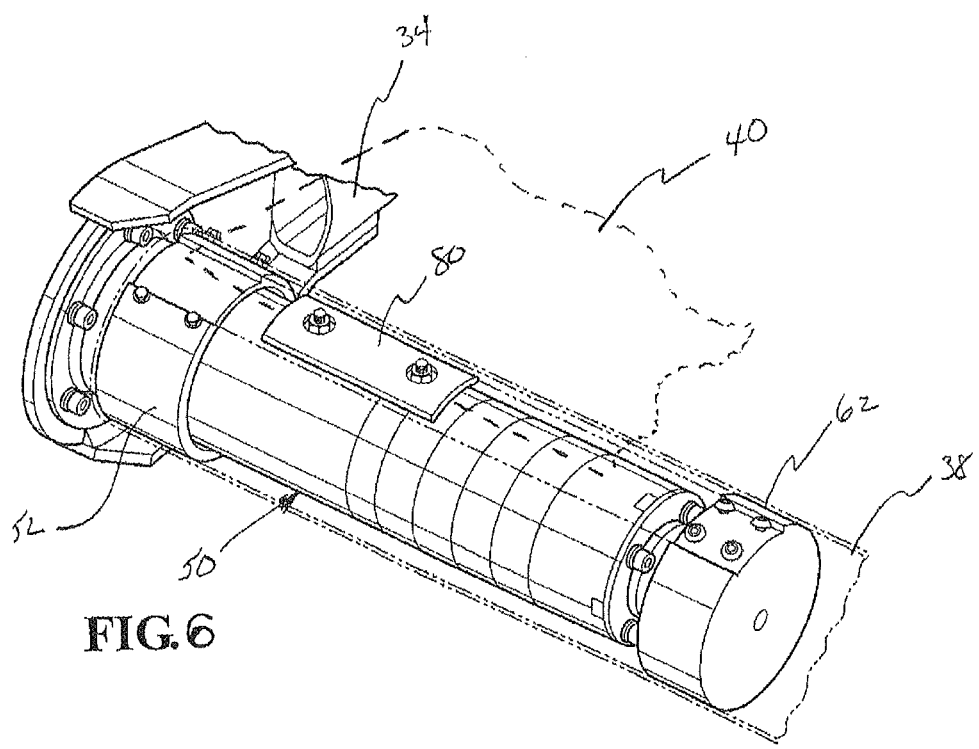
FIG. 6 is another fragmentary perspective view of the motor assembly enclosed within the roller of the roller tarp system.
Figure 7:
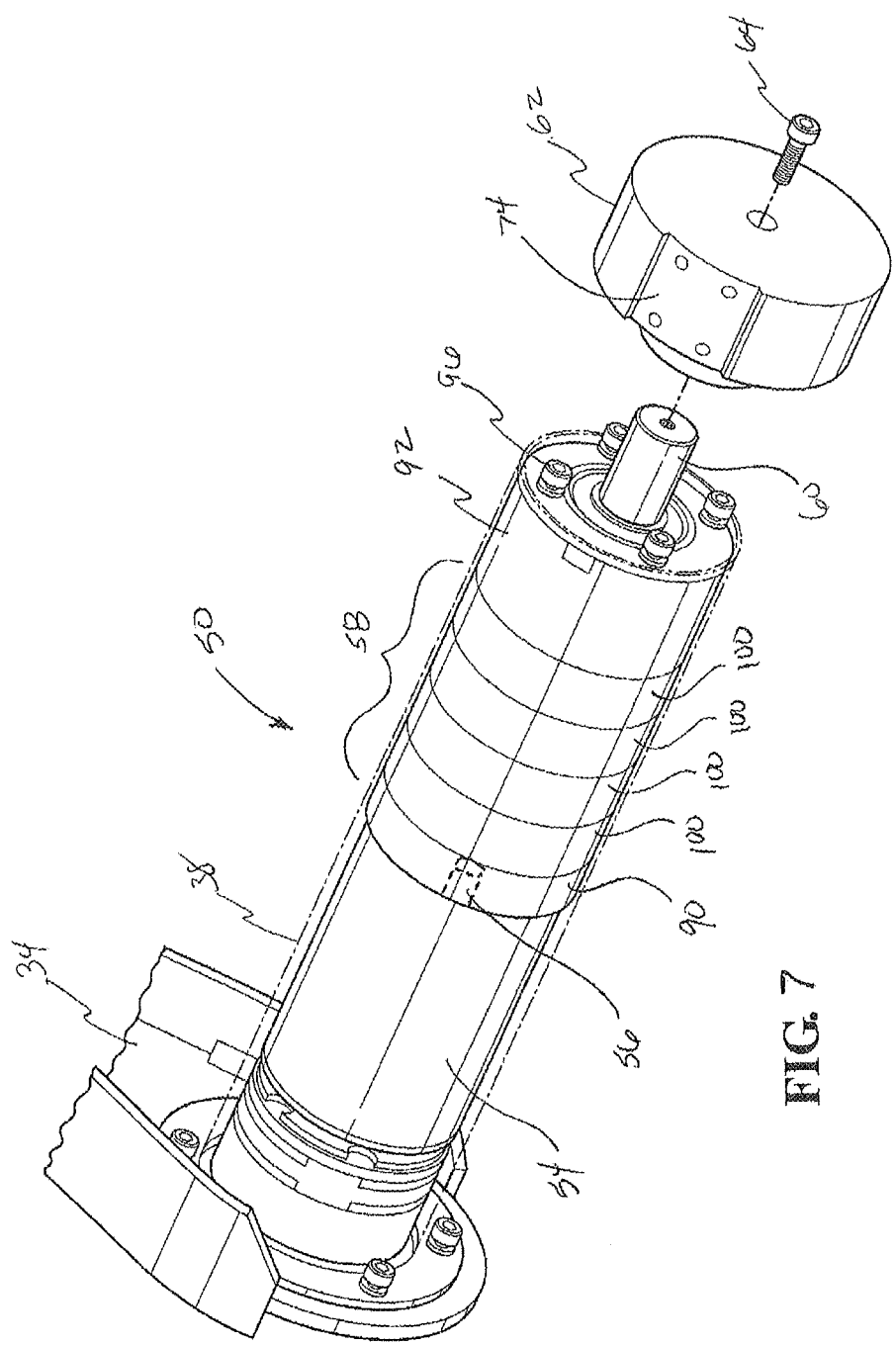
FIG. 7 is a partially exploded perspective view of the motor assembly.

Referring now to FIGS. 3-5, a first end of the tarp spool 38 is slidably and rotatably coupled to the second distal end of the upper pivot arm 34 of the pivot arm assembly 26 by a first bearing sleeve 48 to allow for both rotation of the tarp spool 38 and axial sliding of the tarp spool along axis A relative to the pivot arm assembly 26. That is, the bearing sleeve 48 allow for axial sliding movement of the tarp spool 38 during actuation between the open and closed positions to account for tolerance, bending, and/or synchronization of the pivotal movement between the pivot arm assemblies 26, 28 over the length of the truck bed 12. An opposite second end of the tarp spool 38 is operatively and rotatably coupled to the second distal end of the upper pivot arm 34 of the pivot arm assembly 28 by a drive assembly 50. As shown in FIG. 5, the drive assembly 50 is housed internally within the hollow cylindrical tarp spool 38 so as to conceal the drive assembly 50 from the external elements, damage, and reduce the overall width of the tarp system.

Referring to FIGS. 5-8, the drive assembly 50 comprises a first end fixedly secured to the distal second end of the upper pivot arm 34 and an opposite second end fixedly secured to the tarp spool 38. A second bearing sleeve 52 is fixedly secured to the tarp spool 38 and receives the drive assembly 50 therethrough to allow the tarp spool 38 to rotate around and relative to the drive assembly 50.

Figure 8:
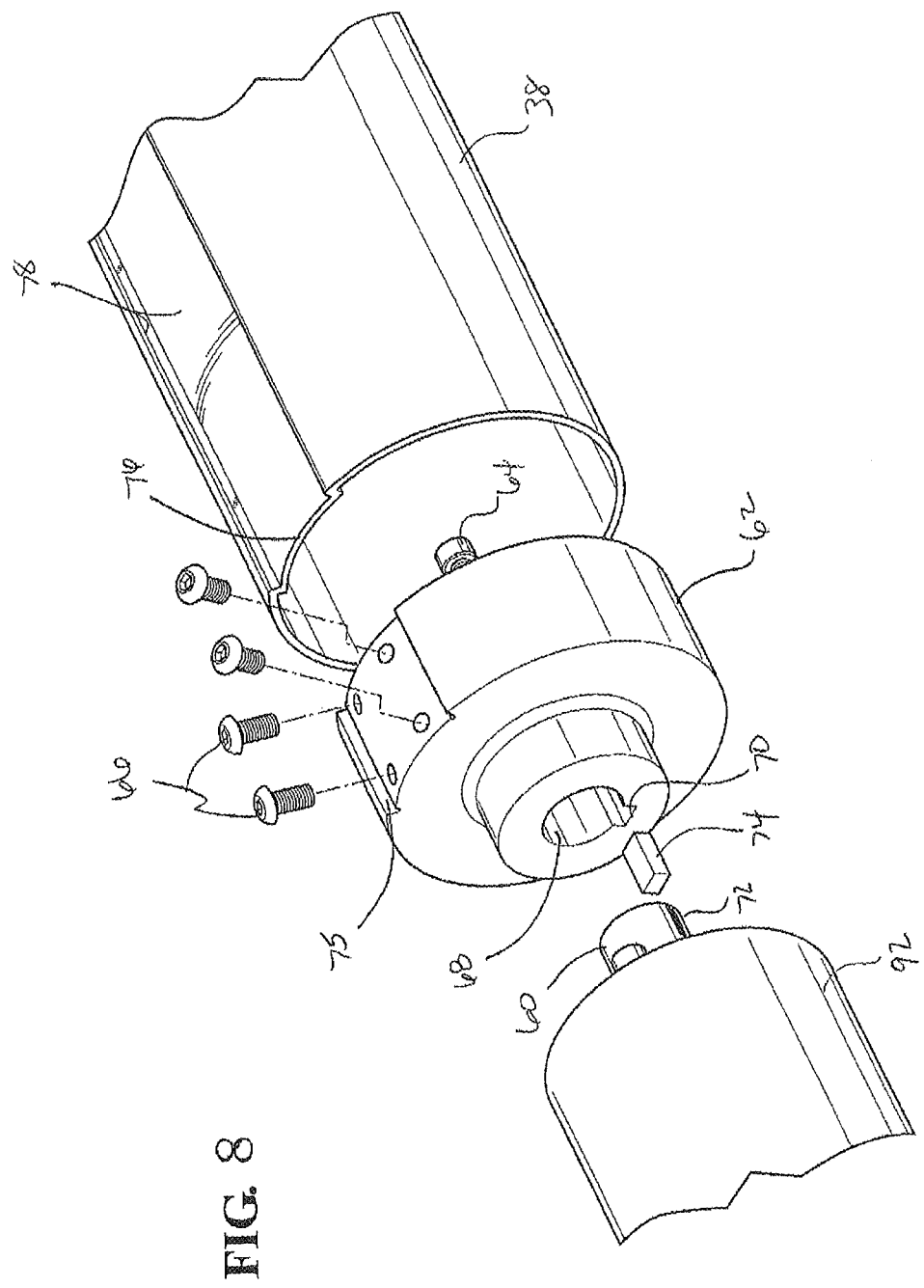
FIG. 8 is a partially exploded perspective view of the motor assembly and roller of the roller tarp system.

More specifically, the drive assembly 50 includes an electric DC motor 54 having a first end fixedly connected to the distal second end of the upper pivot arm 34. A motor output shaft 56 extends axial from the opposite second end of the motor 54 and is rotatably driven by the motor 54. A gear reduction assembly 58 is fixedly secured to the motor 54 and operatively coupled to the motor output shaft 56 for both reducing the output speed while multiplying the output torque of the drive assembly 50. An output drive shaft 60 extends axial from the gear reduction assembly 58 opposite the motor 54 and is rotatably driven by the motor 54 and gear reduction assembly 58. Finally, a drive hub 62 is fixedly coupled to the distal end of the output drive shaft 60 by fastener 64 for rotation therewith. The drive hub 62 is further fixedly secured to the tarp spool 38 by a plurality of fasteners 68 to transfer rotational movement of the output drive shaft 60 to rotational movement of the tarp spool 38. Referring to FIG. 8, the drive hub 62 is disc-shaped and includes a center bore 68 for receiving the output drive shaft 60 therein. The center bore 68 includes an axial notch 70 formed therein and the output drive shaft 60 similarly includes an axial notch 72 formed therein. A generally rectangular shear key 74 is aligned with and seated in each of the notches 70, 72 to rotatably connect the output drive shaft 60 to the drive hub 62 and provide a safety feature of shearing in the event the torque on the drive hub 62 exceed the capability and torque specifications of the output drive shaft 60 and motor 54. The drive hub 62 further includes an outer peripheral surface having an axial slot 74 formed therein and the tarp spool 38 includes an axial protrusion 76 formed in its tube wall corresponding to the axial slot 74. The protrusion 76 is matingly received in the axial slot 74 to rotatably connect the drive hub 62 to the tarp spool 38 and fixedly secured by the fasteners 66. That is, the keyed connection between the protrusion 76 on the tarp spool 38 and the slot 74 in the drive hub 62 transfer the rotational movement of the drive hub 62 to corresponding rotational movement of the tarp spool 38. Further, a channel 78 formed on the backside of the axial protrusion 76 receives a plurality of spaced apart locking keys 80 to fixedly secure one edge of the tarp cover 40 to the tarp spool 38.

Figure 9:
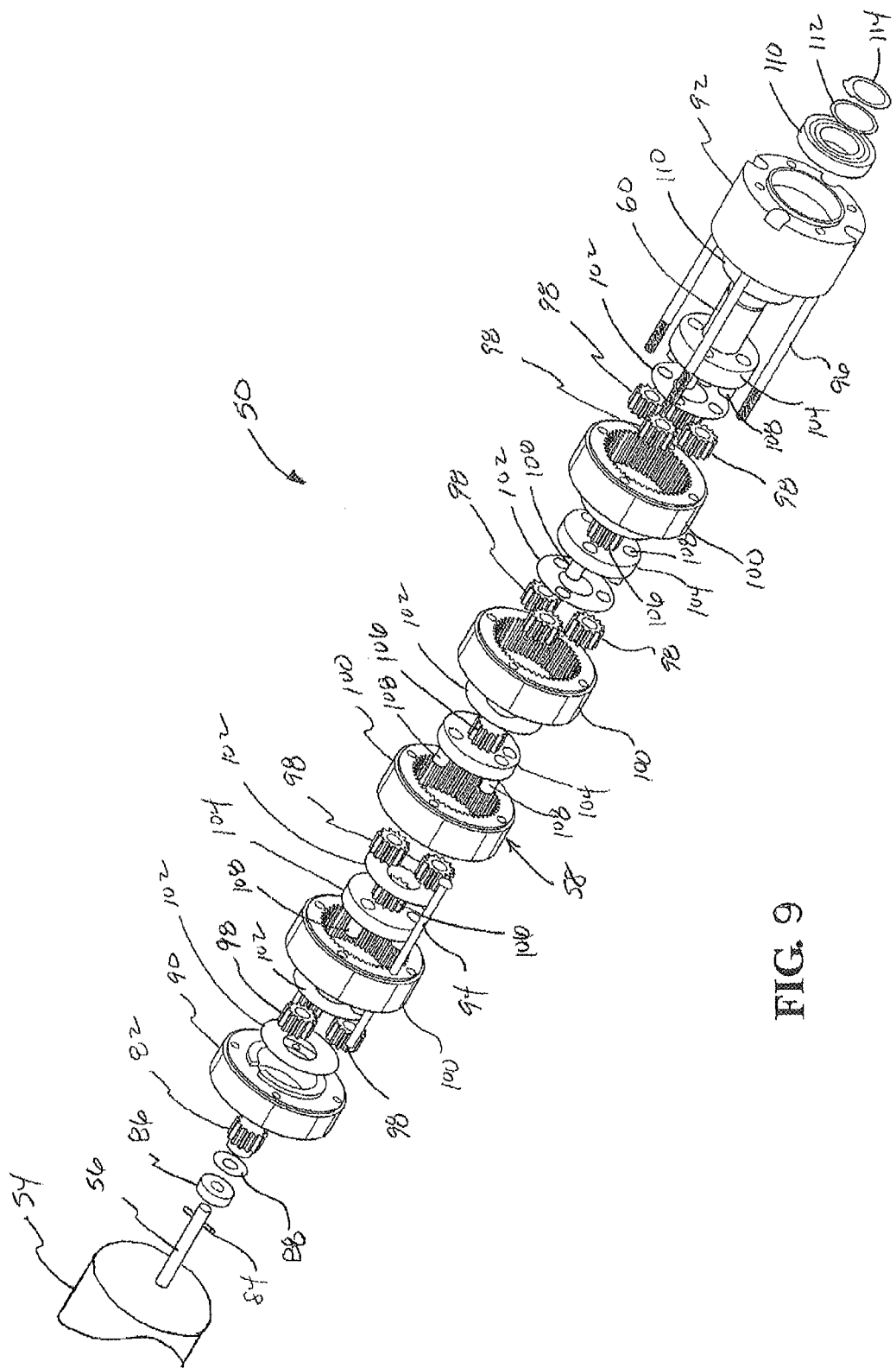
FIG. 9 is an exploded perspective view of the motor assembly.
Figure 10:
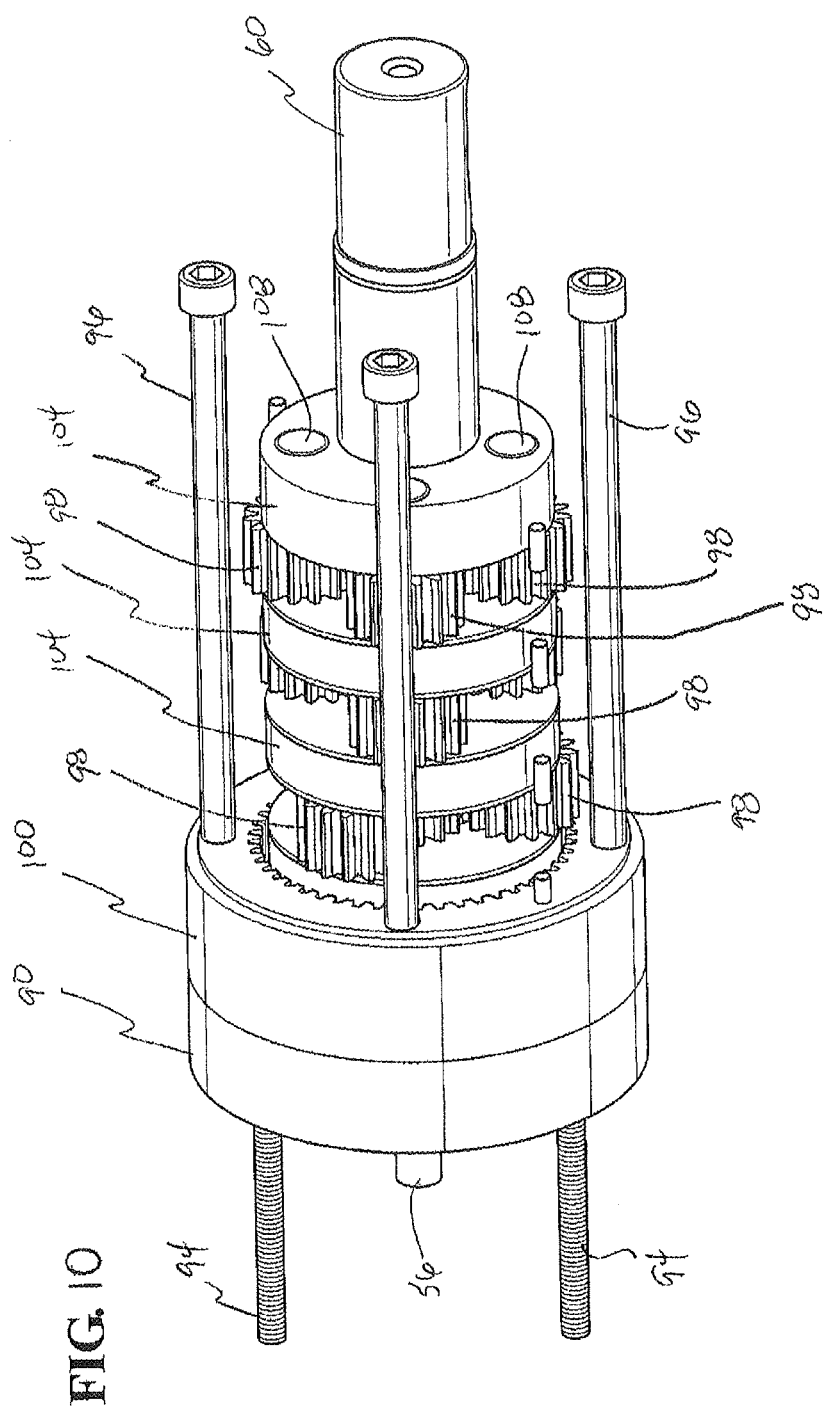
FIG. 10 is a perspective view of the gear reduction assembly of the motor assembly.
Figure 11:
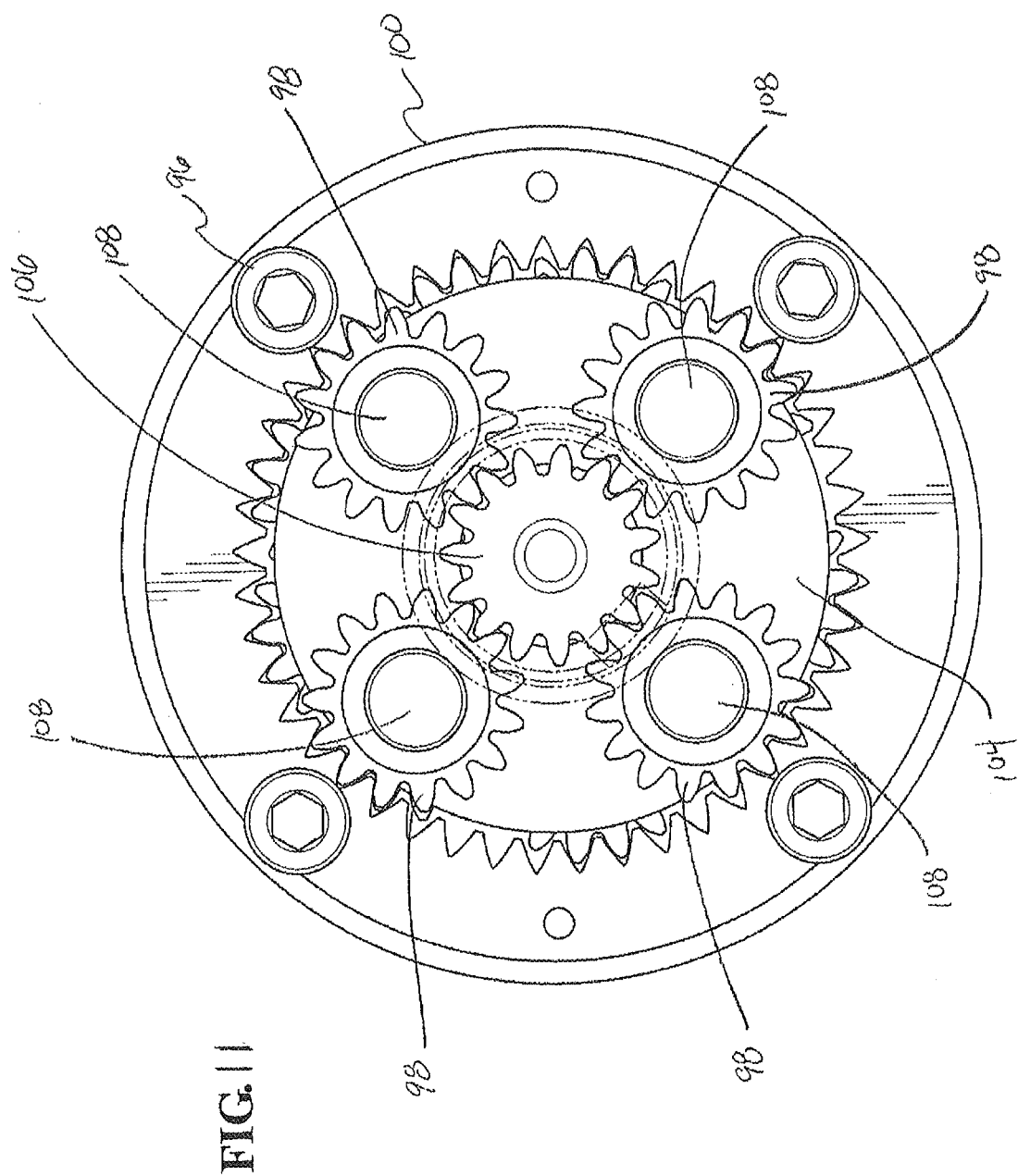
FIG. 11 is a plan view of the gear reduction assembly.

Referring now to FIGS. 9-11, the gear reduction assembly 58 is shown and discussed in more detail. The gear reduction assembly 58, or gear reducer, is operatively coupled between the motor output shaft 56 and the output drive shaft 60 to selectively reduce the speed while multiplying the torque of the output drive shaft 60 relative to the motor output shaft 56 for rotation of the tarp spool 38. The gear reduction assembly 58 includes a series of planetary gear sets, however it should be appreciate that one or more planetary gear sets may be used between the motor output shaft 56 and the output drive shaft 60 as desired for the rotation of the tarp spool 38. In the preferred embodiment shown, the gear reduction assembly 58 includes a first sun gear 82 fixedly connected to the motor output shaft 56 by pin 84 for rotation therewith. A bearing 86 and seal 88 are seated between the sun gear 82 and motor 50. The planetary gear sets of the gear reduction assembly 58 are mounted between a bearing end cap 90 and motor mount 92. The bearing end cap 90 is fixedly secured to the motor 50 by bolts 94 and the motor mount 92 is fixedly secured to the bearing end cap 90 by bolts 96. Each planetary gear set includes a plurality of planetary gears 98 in meshed engagement with a circumferential ring gear 100 axially between opposing bearings 102. The planetary gear set further includes a carrier 104 for supporting a sun gear 106 and coupled to each of the planetary gears 98 by an axle 108. As the first sun gear 82 is rotated by the motor output shaft 56, the first set of planetary gears 98 are engaged to transfer rotation and reduce the speed of rotation through the carrier 104 to the next sun gear 106 as an output gear. The final carrier 104 includes the output drive shaft 60 extending axially therefrom for connection to the drive hub 62. A pair of output bearings 110 rotatable support the output drive shaft 60 through the motor mount 92 and the planetary gear sets are axially fixed by a shim 112 and clip 114 retained on the output drive shaft 60. Further, each of the series of ring gears 100 are aligned axially and staked or pinned to each other to prevent rotation. Thus, rotation of the first sun gear 82 by the motor output shaft 56 is transferred and reduced through each set of planetary gears 98 and carriers 104 to the output drive shaft 60. It should be appreciated that the number of planetary gears 98 may vary as well as the number of planetary gear sets (planetary gears, ring gear, carrier) as required for the desired speed reduction, torque multiplication of the output drive shaft 60. Further, the planetary gear sets may vary based on the strength requirements needed or packaging limitations within the tarp spool 38.

In operation, in the open position shown in FIG. 1 with the tarp system uncovering the truck bed 12, the tarp cover 40 is wound around the tarp spool 38 and supported by a plurality of support hooks 116 extending from the first sidewall 20 of the bed 12. The free end of the tarp cover 40 is fixedly secured to the first sidewall 20 of the truck bed 12. When the electric motor 54 is not energized, the drive assembly 50 acts as a brake to hold the tarp system 10 in the open position against the bias of the torsion springs 42, 44. When the electric motor 54 is energized in a first sense, the drive hub 62 of the drive assembly 50 rotates the tarp spool 38 in a first direction unwinding the tarp cover 40 and allowing the torsion springs 42, 44 to pivot the pivot arm assemblies 26, 28 from the first sidewall 20 toward the second sidewall 22. The cover 40 is pulled off the tarp spool 38 and extended over the truck bed 12. The torsion springs 42, 44 maintain tension on the tarp cover 40 as it is unspooled and extended over the truck bed 12. As the tarp spool 38 passes the opposite second sidewall 22, the spool 38 is wound up against and tucked below at least one locking flange 118 projecting laterally from the sidewall 22. The motor 54 is again not energized such that the motor 54 and the torsion springs 42, 44 maintain the tarp system in the closed position covering the truck bed 12.

In order to actuate the tarp system from the closed position to the open position, the motor 54 is again energized in a second sense to rotate the drive hub 62 and thus the tarp spool 38 in an opposite second direction winding the tarp cover 40 around the tarp spool 38. The winding of the tarp cover 40 around the tarp spool 38 by the drive assembly 50 further pivots the pivot arm assemblies 26, 28 against the bias of the torsion springs 42, 44 from the closed position adjacent the sidewall 22 to the open position adjacent the sidewall 20 whereby the tarp cover 40 is fully wound about the tarp spool 38 and again supported by the hooks 116 in the open position.

With the drive assembly 50 encased with the hollow cylindrical tarp spool 38 and the tarp system 10 stowed below the top of the sidewalls 20, 22 in both the open and closed position, the tarp system 10 is protected from damage during the loading or dumping of the truck bed 12 and positioned to prevent interfering with either the loading or dumping of the truck bed 12. Additionally, the drive assembly 50 is fully enclosed with the tarp spool 38 to prevent exposure to the outside elements or damage during loading or dumping of the truck bed 12.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A tarp system for covering a truck bed, said tarp system comprising:
    a first pivot arm assembly adapted to be pivotally coupled to the truck bed;
    a second pivot arm assembly adapted to be pivotally coupled to the truck bed and spaced from said first pivot arm assembly;
    a generally hollow tarp spool extending longitudinally between opposite first and second ends, said tarp spool rotatably coupled between said first and second pivot arm assemblies for rotatably supporting a tarp cover; and
    a drive assembly housed within said tarp spool adjacent one of said first and second ends, said drive assembly operatively coupled between one of said first and second pivot arm assemblies and said tarp spool for selectively rotating said tarp spool and actuating said tarp system between an open position uncovering the truck bed and a closed position covering the truck bed, and wherein said drive assembly includes a motor.

2. The tarp system as set forth in claim 1 wherein said motor actuates in a first sense for rotating said tarp spool in a first direction thereby unwinding said tarp cover from said tarp spool to cover the truck bed in said closed position and actuates in a second sense for rotating said tarp spool in a second direction opposite said first direction thereby winding said tarp cover about said tarp spool to uncover the truck bed in said open position.

3. The tarp system as set forth in claim 2 wherein said motor includes a first end fixedly coupled to one of said first and second pivot arm assemblies and an opposite second end defined by a motor output shaft rotatably driven by said motor in said first and second directions.

4. The tarp system as set forth in claim 3 wherein said drive assembly includes a drive hub operatively coupled between said motor output shaft and said tarp spool for rotating said tarp spool in response to rotation of said motor output shaft in said first and second directions.

5. The tarp system as set forth in claim 4 wherein said drive assembly includes a gear reduction assembly operatively coupled between said motor output shaft and said drive hub for reducing the relative rotational speed of said drive assembly and multiplying the torque of an output drive shaft relative to said motor output shaft for rotation of said tarp spool.

6. The tarp system as set forth in claim 5 wherein said gear reduction assembly includes at least one planetary gear set coupled between said motor output shaft and said drive hub.

7. The tarp system as set forth in claim 6 wherein at least one of said planetary gear sets includes a sun gear operatively coupled to said motor output shaft, a ring gear, a plurality of planetary gears coupled between said sun gear and said ring gear, and a carrier rotatably coupled to said planetary gears and including said output drive shaft.

8. The tarp system as set forth in claim 7 wherein said drive hub is fixedly connected to said output drive shaft for transferring rotational movement of said output drive shaft to said tarp spool.

9. The tarp system as set forth in claim 8 further including a first bearing sleeve for rotatably supporting said tarp spool about said drive assembly adjacent said first pivot arm assembly and a second bearing sleeve for rotatably supporting said tarp spool about said second pivot arm assembly.

10. The tarp system as set forth in claim 9 further including a base adapted for mounting said tarp system to the truck bed.

11. The tarp system as set forth in claim 10 wherein each of said first and second pivot arm assemblies includes a lower pivot arm having a first end pivotally coupled to said base and an opposite second end and an upper pivot arm having a first end pivotally coupled to said second end of said lower pivot arm and an opposite second end coupled to said tarp spool for pivoting said tarp system between said open and closed positions.

12. The tarp system as set forth in claim 11 wherein at least one of said first and second pivot arm assemblies includes at least one first torsion spring coupled between said lower pivot arm and said base for biasing said tarp system to said closed position and at least one second torsion spring coupled between said upper pivot arm and said lower pivot arm for biasing said tarp system to said closed position.

* * * * *